United States Patent
Hulverscheidt et al.

(10) Patent No.: US 6,762,696 B2
(45) Date of Patent: Jul. 13, 2004

(54) ROUTING DISPLAY FOR NAVIGATION SYSTEMS

(75) Inventors: Jürgen Hulverscheidt, Dortmund (DE); Joachim Schott, Schenklengsfeld (DE)

(73) Assignee: Mannesmann VDO AG, Frankfurt am Main (DE)

(*) Notice: Subject to any disclaimer, the term of this patent is extended or adjusted under 35 U.S.C. 154(b) by 0 days.

(21) Appl. No.: 09/854,022

(22) Filed: May 11, 2001

(65) Prior Publication Data

US 2002/0032524 A1 Mar. 14, 2002

(30) Foreign Application Priority Data

May 13, 2000 (DE) .......................................... 100 23 530

(51) Int. Cl.[7] .............................................. G08G 1/123
(52) U.S. Cl. .............................. 340/995.2; 340/995.27; 701/211
(58) Field of Search ................................ 340/995, 990, 340/988, 995.1, 995.19, 995.2, 995.27; 701/208, 211

(56) References Cited

U.S. PATENT DOCUMENTS

| | | | | |
|---|---|---|---|---|
| 5,323,321 A | * | 6/1994 | Smith, Jr. .................... | 340/995 |
| 5,402,120 A | | 3/1995 | Fujii et al. ................... | 340/988 |
| 5,951,621 A | * | 9/1999 | Palalau et al. .............. | 340/995 |
| 5,974,357 A | * | 10/1999 | Poonsaengsathit et al. . | 701/210 |
| 6,243,646 B1 | | 6/2001 | Ozaki et al. ................. | 701/211 |
| 6,266,613 B1 | * | 7/2001 | Nimura et al. .............. | 340/995 |
| 6,269,304 B1 | * | 7/2001 | Kaji et al. ................... | 701/211 |
| 6,324,467 B1 | * | 11/2001 | Machii et al. ............... | 701/200 |

FOREIGN PATENT DOCUMENTS

| | | | |
|---|---|---|---|
| DE | 38 06 848 | 9/1989 | ............ G08G/1/09 |
| DE | 44 12 859 C1 | 11/1994 | |
| DE | 44 12 859 | 11/1994 | ......... G08G/1/0962 |
| DE | 44 01 206 | 7/1995 | ......... G08G/1/0962 |
| DE | 195 31 824 | 4/1996 | ......... G08G/1/0962 |
| DE | 196 37 011 | 3/1998 | ......... G08G/1/0962 |
| DE | 199 19 139 A1 | 11/1999 | |
| DE | 198 40 120 | 3/2000 | ......... G08G/1/0968 |
| EP | 0 542 331 | 10/1992 | ............ G01C/21/20 |
| GB | 2 260 210 A | 4/1993 | |
| JP | 9-33268 | 2/1997 | ............ G01C/21/00 |

OTHER PUBLICATIONS

Steve Schlott, Fahrzeugnavigation: Routenplanung, Positionsbestimmung, Zielführung, Verlag Moderne Industrie, 1997.

* cited by examiner

Primary Examiner—Brent A. Swarthout
(74) Attorney, Agent, or Firm—Cohen, Pontani, Lieberman & Pavane

(57) ABSTRACT

A routing display for a navigation system in a road vehicle in the form of an electro-optical display can be driven by a routing computer and uses symbols to display a direction of current travel and a direction which is to be taken after a turn-off point relative to one another. The sizes of the two symbols relative to one another is changed such that the relative size of the symbol marking the direction which is to be taken after the turn-off point increases as the turn-off point is approached. Accordingly, when the driver looks at the routing display, he is given the visual impression that he is approaching the turn-off point.

9 Claims, 1 Drawing Sheet

ROUTING DISPLAY FOR NAVIGATION SYSTEMS

BACKGROUND OF THE INVENTION

1. Field of the Invention

The invention relates to a routing display for a navigation system in a road vehicle in the form of an electro-optical display that is drivable by a routing computer, and which is able to use symbols to display a direction of current travel and a direction which is to be taken after a turn-off point relative to one another. The invention also relates to a method for showing routing information.

2. Description of the Related Art

In navigation systems, routing is carried out by outputting routing information via an audio or visual output unit. It has been found to be particularly useful for the visual display of routing information to show arrows which indicate to the driver the direction in which he needs to turn off at the next turn-off point. It is of particular importance that the driver receive an indication of whether this turn-off maneuver is immediately imminent or whether it is only needed after a relatively long distance in addition to the pure turn-off information. For this purpose, the distance to the turn-off point can be indicated directly, for example. However, a problem with this indication is that it can be registered by the driver only with difficulty during the journey. References EP 0 542 331 A1 and DE 44 12 859 C2 disclose routing displays in which a distance indication is integrated visually into a routing symbol. In accordance with the disclosure of EP 0 542 331 A1, the next turn-off point such as, for example, a roundabout is shown in detail. Furthermore, the distance already traveled and the distance which is still to be traveled are displayed by different colors. If this representation is to scale, then the driver is able to estimate the approximate distance to the turn-off point. However, this mode of representation is suitable only when the vehicle is already in the direct vicinity of the turn-off point, since only then is it possible to obtain an indication of the distance to the turn-off point from the geometric extent of the turn-off point and the position of the vehicle. Furthermore, reference DE 44 12 859 C1 discloses a routing display in which a bar graph forms the shaft of a direction arrow, with the active bar which is furthest away from the arrow tip representing the current distance to the turn-off point, and moving toward the arrow tip as this distance decreases. In addition, the book by Stefan Schlott: Fahrzeugnavigation: Routenplanung, Positionsbestimmung, Zielführung [Vehicle Navigation: Route Planning, Position Finding, Routing], Verlag Moderne Industrie, 1997 discloses, in FIG. 18, the practice of outputting different routing instructions on the basis of the distance of the vehicle from the turn-off point. In this context, a distinction is drawn between acknowledgement of a direction taken, an advance instruction and an instruction. The advance instruction is composed of two separate arrows, but permits no indication of the distance to the turn-off point.

SUMMARY OF THE INVENTION

The object of the present invention is to specify a routing display for a navigation system which is used to give the driver a visual impression of the distance to the next turn-off point. In particular, this routing display is intended to be able to be used for advanced warning instructions. Another object of the present invention is to specify a corresponding method for showing routing information.

The object is met by a routing system by in which the symbols for the direction of current travel and the direction which is to be taken after a turn-off point are changed in terms of their sizes relative to one another on the basis of the distance to the turn-off point. In one embodiment, the relative size of the symbol marking the direction which is to be taken after the turn-off point increases as the turn-off point is approached. As a result of this, the display unit gives the driver the visual impression that the turn-off point is getting closer. This visual impression may be achieved by changing the size of only one of the two symbols being changed while the size of the other symbol remains unchanged as stated above. Alternatively, the size of both symbols may be changed. In this context, the size of one or both symbols is preferably changed in two dimensions, i.e. both the length and the width of the symbol are changed. This gives a particularly clear representation of the change.

In one embodiment of the present invention, the symbols may additionally be changed in terms of their relative distance from one another. This allows the effect of approaching the junction to be clearly enhanced when looking at the routing display.

In a preferred embodiment, at least one of the symbols is an arrow display, with the arrow display being particularly preferred for the direction which is to be taken after the turn-off point. This gives a clear indication of the direction which is to be taken. In addition, the two symbols do not need to be completely physically separate from one another, but instead may also be close together or even connected to one another. Particularly in the latter case, a colored distinction between the symbols is preferred, since it is then possible to quickly separate the symbol for the direction of current travel from that for the direction which is to be taken after the turn-off point.

The object of the present invention is also met by a method for showing routing information from a navigation system for road vehicles on an electro-optical display which is driven by a routing computer and on which a direction of current travel and a direction which is to be taken after a turn-off point are displayed relative to one another using symbols. According to the inventive method, the distance to the turn-off point is determined and the symbols for the direction of current travel and the direction which is to be taken after the turn-off point are changed in terms of their sizes relative to one another on the basis of the distance to the turn-off point.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawing, wherein like reference characters denote similar elements throughout the several views.

DETAILED DESCRIPTION OF THE PRESENTLY PREFERRED EMBODIMENTS

Figure 1A:
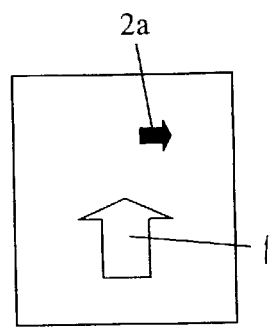
FIG. 1a is a schematic view of a first routing display according to the present invention showing directional arrows for routing information when the vehicle is at a first distance from a turnoff.
Figure 1B:
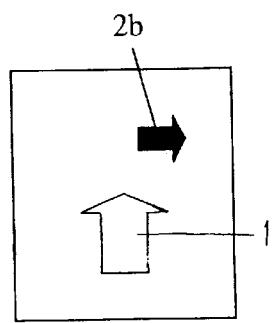
FIG. 1b is a schematic view of the first routing display of FIG. 1a when the vehicle is at a second distance from a turnoff which is closer than the first distance.
Figure 1C:
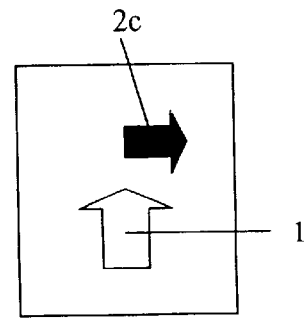
FIG. 1c is a schematic view of the first routing display of FIG. 1a when the vehicle is at a third distance from the turnoff which closest to the turnoff.

FIGS. 1a, 1b, and 1c show a first routing display having three different representations for three different distances to the turn-off point. These routing displays are an advance warning type instruction. As the vehicle comes closer to the turn-off point than a certain prescribed minimum distance the display changes over to a more detailed representation of the turn-off point and of the directions of travel which are to be taken, as is known from the aforementioned prior art. In the representation shown in FIG. 1a, the vehicle is at a first distance from the turn off point which is a furthest distance away from the turn-off point. In FIG. 1b, the vehicle is at a second distance which is closer to the turnoff point and in FIG. 1c the vehicle is at a third distance which is closest to the turn-off point. In FIGS. 1a, 1b, 1c, an arrow 1 indicates the current direction of travel of the vehicle. The size and position of the arrow 1 remain independent of the distance to the next turn-off point. In contrast, the size and position of the arrows 2a, 2b, and 2c, which indicate the direction of travel after the next turn-off point, are changed relative to those of the arrow 1. In FIG. 1a, which shows the greatest remaining distance to the turn-off point for the situations shown, the arrow 2a; is smaller and is further away from the arrow 1 than in FIGS. 1b and 1c, which show later representations. As the vehicle gets closer and closer to the turn-off point, the arrow 2b and 2c become enlarged and also moves closer to the arrow 1. This mode of representation signals the approach to the turn-off point visually to the driver. In addition, the different representation of the arrows 1 and 2a, 2b, 2c provides a simple way for the driver to distinguish between the direction of current travel and the direction which is to be taken after the next turn-off point.

Figure 2A:
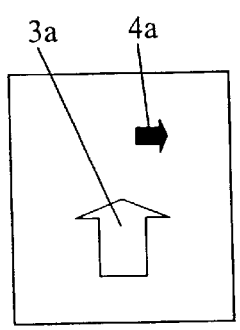
FIGS. 2a, 2b, and 2c are schematic views of a second routing display according to the present invention showing directional arrows at the three different distances from a turnoff corresponding to FIGS. 1a, 1b, and 1c.
Figure 2B:
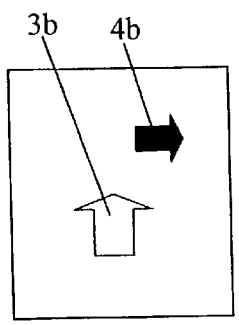
Figure 2C:
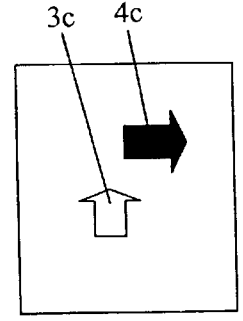

FIGS. 2a, 2b, and 2c show a second inventive routing display corresponding to different distances to the turn-off point as in FIGS. 1a, 1b, and 1c. In this embodiment, not only is the size of the arrow 4a, 4b, 4c for the direction which is to be taken after the turn-off point changed, but also the size of the arrows 3a, 3b, 3c for the direction of current travel. While the arrow 4b is larger than arrow 4a as the distance to the turn-off point decreases, the arrow 3b is correspondingly smaller than the arrow 3a.

Figure 3A:
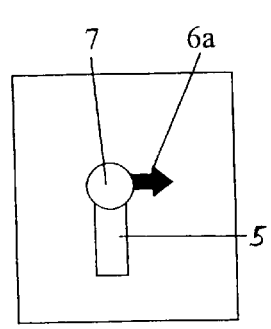
FIGS. 3a, 3b, and 3c are schematic views of a third routing display according to the present invention showing directional arrows at the three different distances from a turnoff corresponding to FIGS. 1a, 1b, and 1c.
Figure 3B:
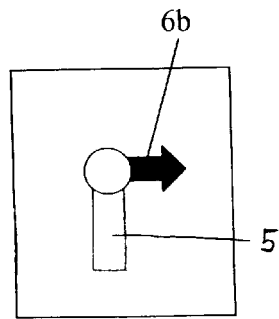
Figure 3C:
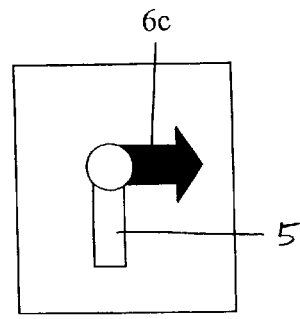

FIGS. 3a, 3b, and 3c show a third embodiment in which the symbols for the direction of current travel and the direction which is to be taken after the next turn-off point are close together and are linked to one another by a symbol 7 marking the turn-off point. In this case, the direction which is currently being taken is marked by a bar 5 whose size and position remain unchanged. The direction which is to be taken after the turn-off point is marked by the arrows 6a, 6b, 6c. The size of the arrow 6b is larger than the size of arrow 6a and the size of the arrow 6c is larger than the size of the arrow 6b, such that the arrow showing the direction after the turn-off point increases as the distance to the turn-off point decreases.

The invention has been described in more detail with the aid of three illustrative embodiments without being limited to the specific design thereof.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for showing routing information from a navigation system for a road vehicle on an electro-optical display driven by a routing computer, the method comprising the steps of:

displaying a symbol for a direction of current travel and a symbol for a direction to be taken after a turn-off point relative to the direction of current travel;

determining a distance from the vehicle to the turn-off point; and changing the size of the symbol for the direction of current travel relative to the size of the symbol for the direction to be taken after the turn-off point in response to the distance to the turn-off point while maintaining the same view of the symbols including changing the size and position of the symbol for the direction to be taken after the turn-off point in response to the distance to the turn-off point, and maintaining the size and position of the symbol for the direction of current travel independent of the distance to the turn-off point.

2. A routing display for a navigation system in a road vehicle, said routing display comprising:

an electro-optical display device drivable by a routing computer;

means for displaying, on said display device, a symbol for a direction of current travel and a symbol for a direction to be taken after a turn-off point relative to said direction of current travel, said means for displaying comprising means for displaying the symbols in isolation from a depiction of roads corresponding to the direction of current travel and the direction to be taken after the turn-off point; and means for changing the size of the symbol for the direction of current travel relative to the size of the symbol for the direction to be taken after the turn-off point in response to a distance from the vehicle to the turn-off point while maintaining the same view of the symbols such that the relative size of the symbol for the direction to be taken after the turn-off point increases as the distance of the vehicle to the turn-off point decreases, and such that the distance to the turn-off point is indicated exclusively by the change in the relative sizes of the symbols.

3. The routing display of claim 2, further comprising means for changing a relative distance between the symbol for the direction of current travel and the symbol for the direction to be taken after the turn-off point in response to the distance to the turn-off point.

4. The routing display of claim 2, wherein said means for changing the size of the symbol for the direction of current travel relative to the size of the symbol for the direction to be taken after the turn-off point comprises means for changing two dimensions of said sizes of said symbols.

5. The routing display of claim 2, wherein said means for changing the size of the symbol for the direction of current travel relative to the size of the symbol for the direction to be taken after the turn-off point comprises means for changing the size and position of the symbol for the direction to be taken after the turn-off point and means for maintaining the size and position of the symbol for the direction of current travel independent of the distance to the turn-off point.

6. The routing display of claim 2, wherein at least one of the symbols is an arrow.

7. The routing display of claim 2, wherein said routing display is a liquid crystal display.

8. The routing display of claim 2, wherein the symbol for the direction of current travel is a different color than the symbol for the direction to be taken after the turn-off point.

9. The routing display of claim 2, wherein said means for displaying comprises means for displaying advanced warning instructions by displaying a symbol for a direction of current travel and a symbol for a direction to be taken after a turn-off point relative to the direction of current travel on a more detailed representation of the turn-off point when the vehicle is closer to the turn-off point than a minimum distance.

* * * * *